No. 872,202. PATENTED NOV. 26, 1907.
W. M., W. G., G. B. & S. Q. SAUNDERS.
WATER WHEEL.
APPLICATION FILED APR. 9, 1906.

3 SHEETS—SHEET 1.

Witnesses
W. A. Williams
C. P. Wright Jr.

Inventors
W. G. Saunders,
G. B. Saunders,
S. Q. Saunders,
W. M. Saunders,
By A. S. Pattison
Attorney No. 872,202. PATENTED NOV. 26, 1907.
W. M., W. G., G. B. & S. Q. SAUNDERS.
WATER WHEEL.
APPLICATION FILED APR. 9, 1906.

3 SHEETS—SHEET 3.

UNITED STATES PATENT OFFICE.

WILLIAM M. SAUNDERS, WESLEY G. SAUNDERS, GEORGE B. SAUNDERS, AND SAMUEL Q. SAUNDERS, OF RICHLAND, OREGON.

WATER-WHEEL.

No. 872,202.　　　　Specification of Letters Patent.　　　Patented Nov. 26, 1907.

Application filed April 9, 1906. Serial No. 310,705.

*To all whom it may concern:*

Be it known that we, WILLIAM M. SAUNDERS, WESLEY G. SAUNDERS, GEORGE B. SAUNDERS, and SAMUEL Q. SAUNDERS, citizens of the United States, residing at Richland, in the county of Baker and State of Oregon, have invented certain new and useful Improvements in Water-Wheels, of which the following is a specification, reference being had therein to the accompanying drawing.

Our invention relates to improvements in water wheels.

The object of our invention is to provide a water wheel of this character, which is adapted to rest upon the surface of the stream or body of water, and adapted to be operated by the current or tides thereof, and the supporting means so arranged that the wheel can be raised or lowered for adjusting it to rest upon the surface of the water.

Another object of our invention is to provide a wheel that can be removed from the stream as a protection from ice, gorges, or floating debris, in order to save the wheel from unnecessary exposure when not in use.

A still further object of our invention is to provide a more simple and effective device of this character, and one in which a greater power is obtained with a wheel of a specified size.

Figure 1:
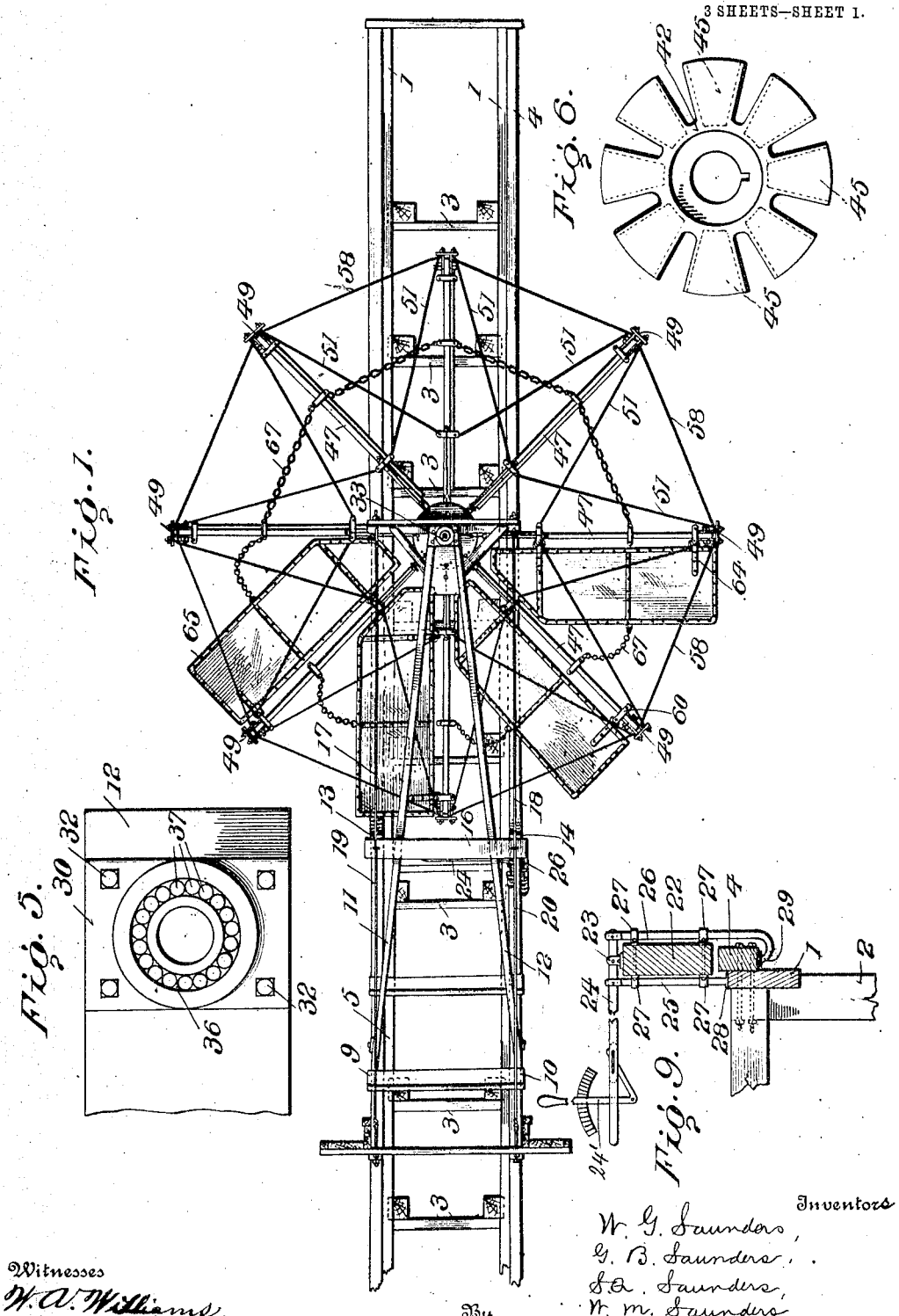
Figure 2:
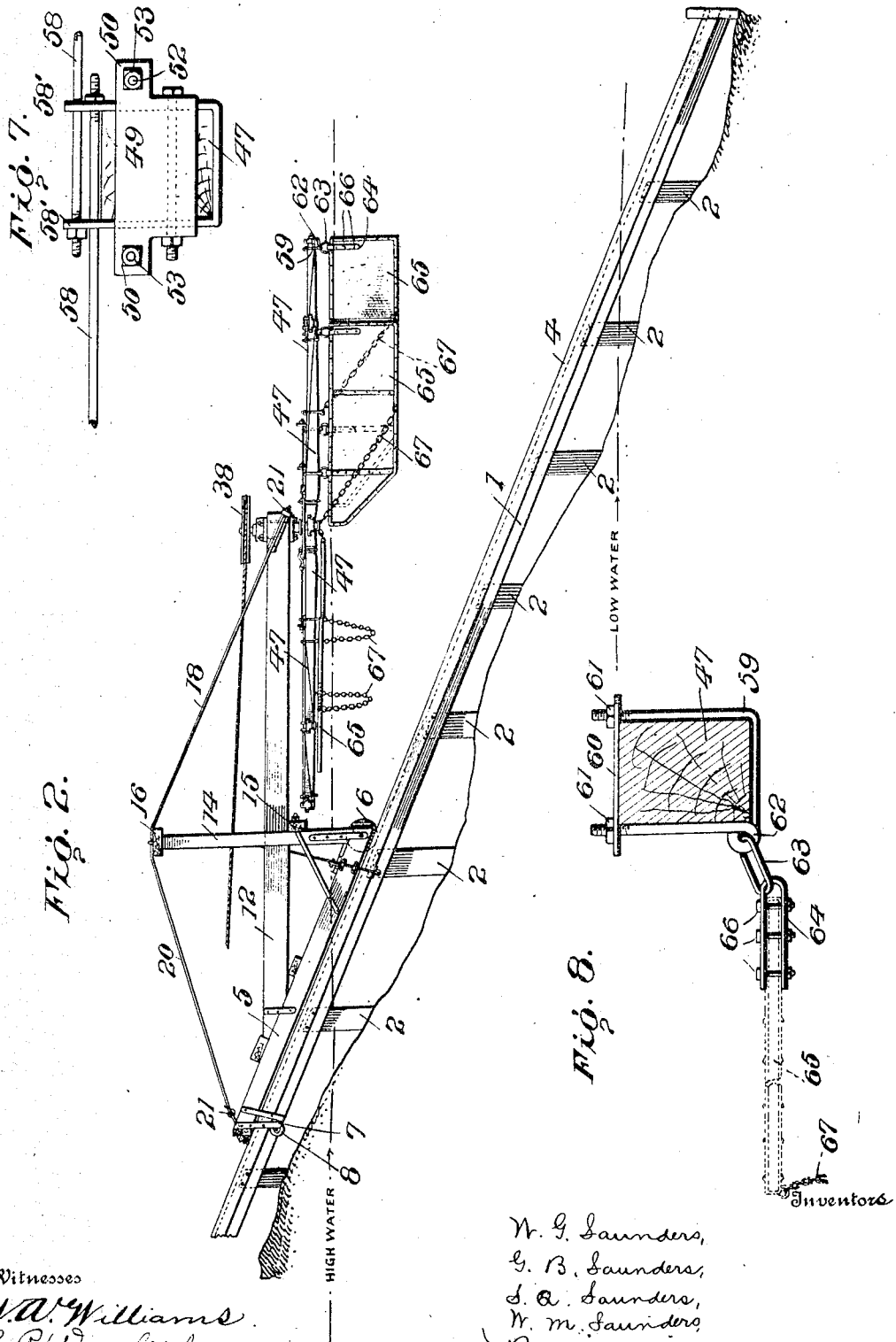
Figure 3:
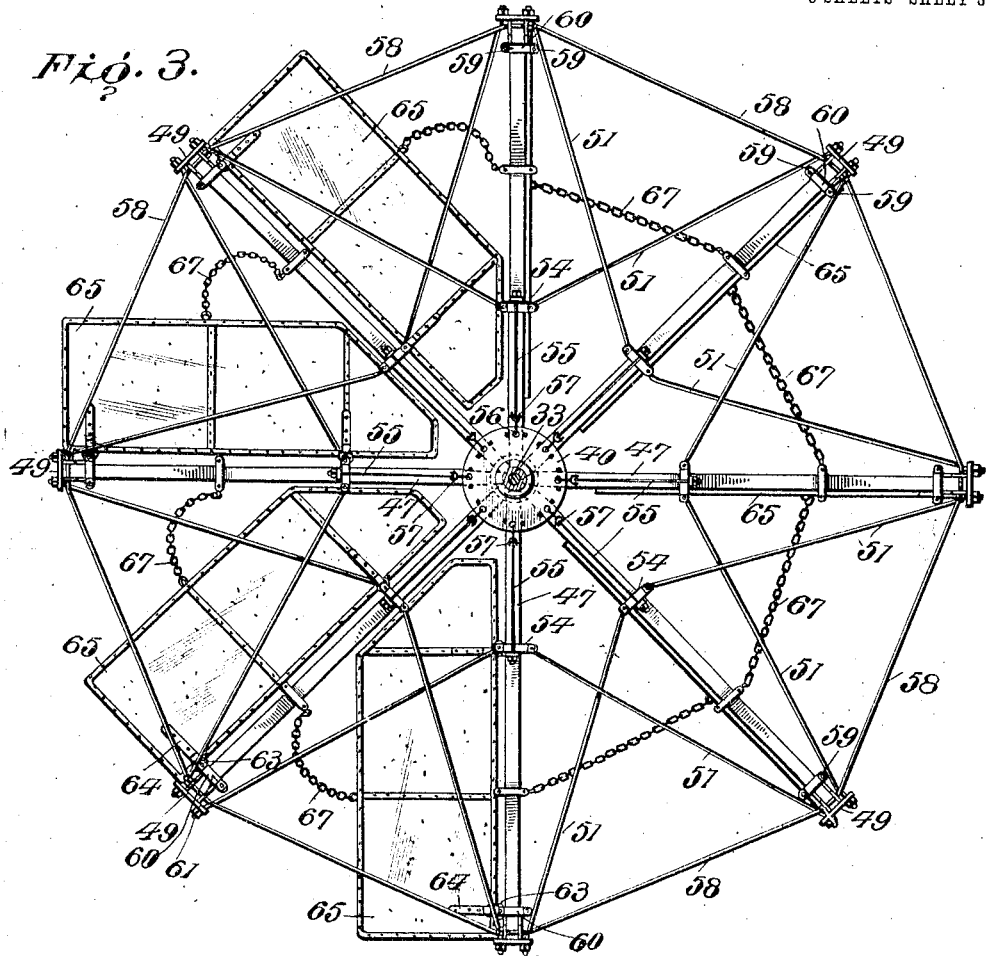
Figure 4:
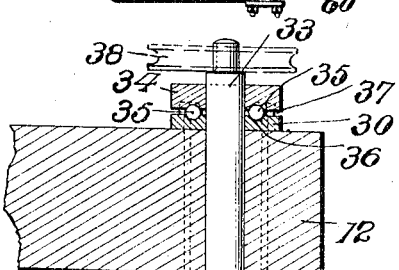

In the accompanying drawings, Figure 1, is a top plan view of our improved wheel and supporting means. Fig. 2, is a side elevation of Fig. 1. Fig. 3, is an enlarged top plan view of the water wheel showing the specific construction thereof. Fig. 4, is a vertical sectional view of the wheel-carrying shaft and its connection with the supporting means and also the connection of the blade supporting arms therewith. Fig. 5, is a plan view of the ball bearing connection between the supporting arm and the shaft. Fig. 6, is a plan view of the spoke-receiving socket carried by the lower end of the shaft. Fig. 7, is an enlarged end view of the spoke showing the truss-rod connection therewith. Fig. 8, is an enlarged plan view of the paddle-supporting hinge. Fig. 9, is a vertical sectional view of the clutch mechanism between the wheel-supporting truck and the inclined track.

Referring now to the drawings, 1 represents an inclined frame which is supported upon standards 2 which are preferably in the form of piles which are driven into the bottom of the river bed, and the said frame has its lower end extending below the low water or tide of the river bed, so that the wheel can be at any time lowered upon the surface of the water. The upper ends of the piles or standards 2 are connected by the timbers 3 which form a more rigid support for the track. Secured to the side of the frame 1 are the tracks 4 which extend the entire length of the frame, and below the low water level into the water. The specific construction of this supporting frame can be varied without departing from our invention. Mounted upon said frame is a truck 5 which is provided at its lower end with wheels 6 which bear upon the upper face of the frame 1. The upper end of the truck is provided on the outside with the downwardly-extending arms 7 carrying on their inner faces the wheels 8 which are adapted to engage the lower face of the beams 4 and prevent the rear end of the truck from tilting from the weight of the wheel, as will be hereinafter more fully described. The truck 5 is made of a rectangular form, and secured thereto adjacent the rear end at 9 and 10 are the forwardly-extending horizontal converging bars 11 and 12, the outer ends of which are adapted to support the wheel. The forward end of the truck is provided with upwardly-extending standards 13 and 14 which extend considerably above the bars 11 and 12, and secured to the standards below the bars, is a transverse bar 15 supporting the same in said horizontal position. The upper ends of said standards are also connected by a transverse bar 16 to which are secured the forwardly-extending tie-rods 17 and 18 which are also secured to the forward end of the bars 11 and 12 for bracing the same. Secured also to said transverse bar 16 are the rearwardly-extending tie-rods 19 and 20 which are secured to the truck 5, and are provided with turn-buckles 21 for tightening the same.

From the foregoing description, it will be seen that the truck is moved up and down upon the track for bringing the wheel up and keeping it upon the surface of the water. In order to hold the truck in its adjusted position upon the track, we provide a clutch mechanism which engages the upper and lower face of the rails. The side beam 22 of the truck 5 is provided with an upwardly-extending lug 23 to which is intermediately pivoted a lever 24, said lever extending upwardly above the truck in a place where it can be readily operated. Said lever has at its upper end means for holding it in its adjusted position. The said lever, on each side of the beam has pivotally connected thereto the downwardly-extending sliding bars 25 and 26 which move in guideways 27 carried by the side of the beam 22. The bar 25 has an enlarged lower end 28 to rest upon and grip the upper face of the side beam 1 of the frame, while the bar 26 has an inwardly and upwardly turned end 29 adapted to engage the lower face of the track 4. It will be readily seen that by throwing the lever 24 downward, the bar 25 is thrown down upon the bar 1 and the bar 26 is drawn upwardly under the track 4, and firmly locks the truck in its adjusted position on the tracks, and also locks the same against any vertical or side-wise movement.

The outer ends of the horizontal bars 11 and 12 have secured above the same, a plate 30, and below a plate 31 by means of bolts 32. The said plates are provided with openings through which a vertically-disposed shaft 33 loosely and rotatably passes. Secured to the said shaft above the plate 30, is a plate 34 which is provided on its inner face with a ball-race 35, and the plate 30 has an oppositely arranged ball-race 36, and in said race are the balls 37 whereby the shaft is supported to be easily rotated. The upper end of the shaft 33 has keyed thereon the pulley wheel 38, by means of which the power from the shaft 33 is transmitted to the desired point.

The shaft 33 extends considerably below the bars 11 and 12, and carried by the same is a sleeve 38' which has its upper end bearing against the plate 31 and prevents the upward movement of the shaft. The lower end of the shaft, below the sleeve, is screw-threaded at 39, and clamped on said shaft against the sleeve 38' is an enlarged circular plate 40 by means of a nut 41. Surrounding the said lower end of the shaft and said nut is a hub 42 which is secured to the shaft below the nut 41 by means of a nut 43 screwed upon the threaded portion 44 of the shaft. The shaft is provided with a spline which enters a slot in the hub and therefore the hub is held upon the shaft against rotation. The hub 42 is provided with the radially-extending sockets 45 adapted to receive, and in which are securely fastened the radially-extending spokes 47 or arms of the wheel. Passing vertically through the plate 40 are bolts 48 by means of which the spokes are fastened in the hubs. The said spokes 47, as shown, are of an elongated form, and the outer ends thereof are provided with the sockets 49 which are provided with the outwardly-extending ears 50 through which passes the screw-threaded end 52 of the brace-rods 51, and secured on said screw-threaded portion 52 on the outside of the ears 50, are nuts 53 by means of which said rods are tightened. The inner ends of said rods are connected with clips 54 of the adjoining spoke. Connected to the clips are rods 55 which have their inner ends passing through the openings 56 in the plate 40 and formed into loops 57. The outer ends of the spokes 47 are connected together by brace-rods 58 which pass through the clips 58' and doubly brace the spokes.

The spokes 47 carry the paddles or blades by means of which the shaft is rotated, and said paddles or blades are of a feathering type, as is readily understood. The spokes 47 adjacent their outer ends are provided with yokes 59 which are firmly clamped thereto by means of the cross-bar 60, and the nuts 61, while the clip or yoke 54 serves as means for pivotally supporting the inner end of the blades. The lower corner of said yokes are provided with an eye 62 in which is mounted a link 63 through which passes the U-shaped blade securing member 64. The said blades 65 pass between the arms of this U-shaped member 64, and passing through the blades and the member are bolts 66 by means of which the blades are rigidly secured, and by this structure it will be seen that the blades traveling up stream are adapted to swing in a horizontal position, while the blades on the opposite side of the wheel, or traveling with the current, are held in a vertical position and receive the full force of the current, while, as is understood, this arrangement allows the blades traveling up stream to slide lightly over the surface of the water and cause very little friction, and thus greatly increase the power of a wheel of a specified size.

Connected to the lower edge of each blade is a chain 67 which has its opposite end connected to the adjoining spoke, and thus the blades are allowed to swing in a horizontal position in one direction, but are prevented from swinging past a vertical position in the opposite direction.

The whole wheel, as heretofore described, being supported upon the truck 5, the same can be raised or lowered at will by any desired means attached to the truck, but we preferably use a cable for raising the same, as the weight is sufficient to cause it to travel downward when the clutch mechanism is released. The clutch holding it, as before described, against any upward or side-wise movement, and also against the pull of the drive belt passing around the pulley wheel on the drive shaft. The track being below the low water line, it is also seen that the wheel can be readily kept at all times in an operative position whether the water is high or low. The wheels, at the forward end of the frame being above the track, support the weight of the wheel, while the wheels at the rear being beneath the track, prevent the weight of the wheel, which is opposite the lower end, from tilting the truck upon the forward wheels, and thus the truck is firmly held on the track.

Having thus described our invention, what we claim and desire to secure by Letters Patent, is:—

1. A water wheel, comprising an oblique track, a truck movable upon said track, a water wheel carried by the truck, an intermediately pivoted lever carried by the truck, a bar pivoted to the lever on each side of said pivotal connection, one of said bars adapted to engage the upper face of the track and the other bar engaging the lower face of the track, whereby the truck is held upon the track and in its adjusted position.

2. A water wheel, comprising an oblique track, a truck movable upon said track, a water wheel carried by the truck, an intermediately-pivoted lever carried by the truck, a bar pivoted to said lever on one side of its pivotal connection and engaging the upper face of the track, a second bar pivoted to the lever on the other side of its pivotal connection and having an upwardly-turned lower end engaging the lower face of the track, whereby the movement of the lever throws the bars in or out of engagement with the track for holding or releasing the truck.

3. A water wheel, comprising an oblique track, a truck thereon, wheels carried by its forward end engaging the upper face of the track, wheels carried by the rear end for engaging the lower face of the track, an outwardly extending horizontal arm carried by the outer end of the truck, and a water wheel carried by the outer end of said arm.

4. A water wheel, comprising an oblique track, a truck thereon, wheels carried by its forward end and engaging the upper face of the track, wheels carried by the rear end for engaging the lower face of the track, a friction clutch carried by the truck for holding the truck in its adjusted position on the track, a horizontal arm carried by the truck, and a water wheel carried by said arm.

5. A water wheel, comprising a supporting arm, plates carried by the upper and lower faces of said arm, a shaft passing through the arm and plates, the upper plate having a ball-race surrounding the shaft, balls within said race, a plate secured to the upper end of the shaft and having a ball-race arranged opposite the balls, a sleeve carried by the shaft and below the plate carried by the lower face of the arm, the shaft having a reduced lower screw-threaded end, and a hub thereon, a nut on said screw-threaded end and below the hub and locking the hub on the shaft, spokes carried by said hub and feathering blades carried by said spokes.

6. A water wheel, comprising an oblique track, a truck movable upon said track, wheels carried by its forward end for engaging the upper face of the track, wheels carried by the rear end for engaging the lower face of the track, a friction locking means for the truck engaging the upper and lower faces of the track, a horizontal arm carried by the upper end of the truck, plates carried by the upper and lower faces of said arm, a shaft passing through the arm and plates, the upper plate having a ball-race surrounding the shaft, balls within said race, a plate secured to the upper end of the shaft and having a ball-race arranged opposite the balls, a sleeve carried by the shaft and below the plate carried by the lower face of the arm, the shaft having a reduced lower screw-threaded end, and a hub thereon, a nut on said screw-threaded end and below the hub and locking the same on the shaft, spokes carried by said hub and feathering the blades carried by said spokes.

In testimony whereof we affix our signature in presence of two witnesses.

WILLIAM M. SAUNDERS.
WESLEY G. SAUNDERS.
GEORGE B. SAUNDERS.
SAMUEL Q. SAUNDERS

Witnesses:
FRED. H. LOONEY,
WM. R. USHER.